Oct. 6, 1970  R. S. SCHARLACK  3,532,392
ANTI-SKID BRAKING SYSTEM
Filed Oct. 21, 1968  2 Sheets-Sheet 1
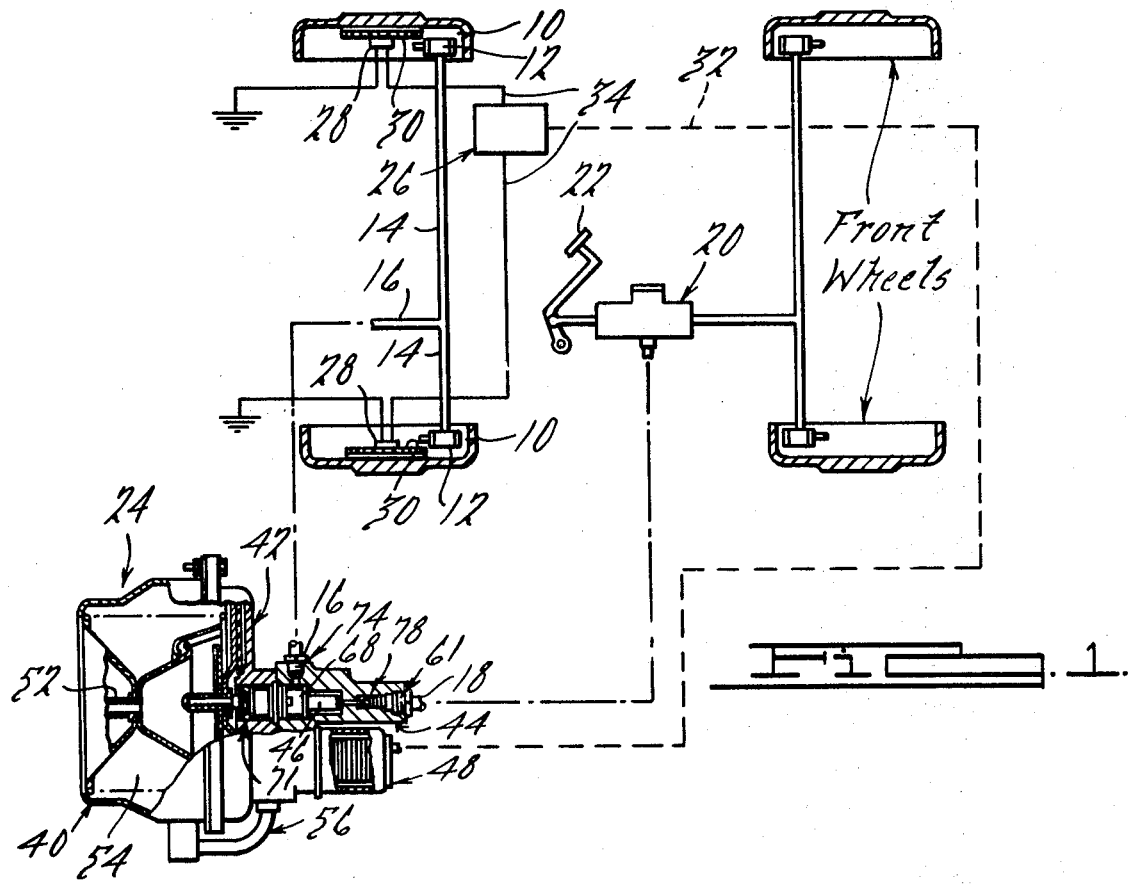
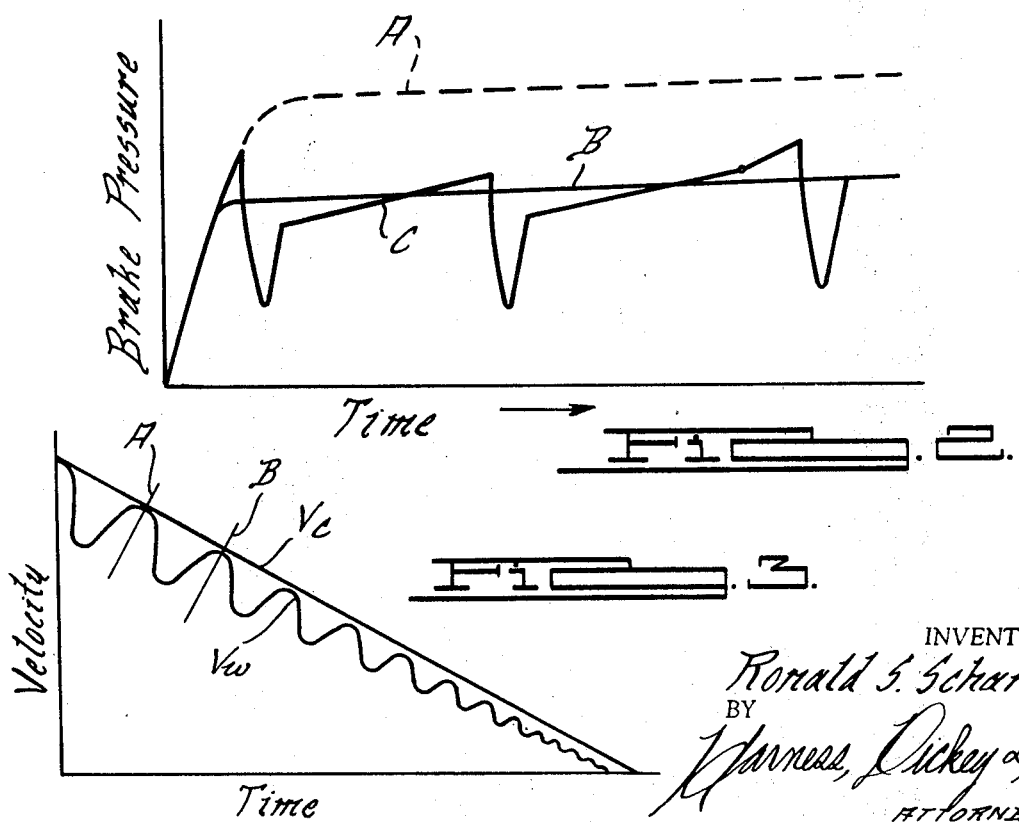
INVENTOR.
Ronald S. Scharlack
BY
Harness, Dickey & Pierce
ATTORNEYS

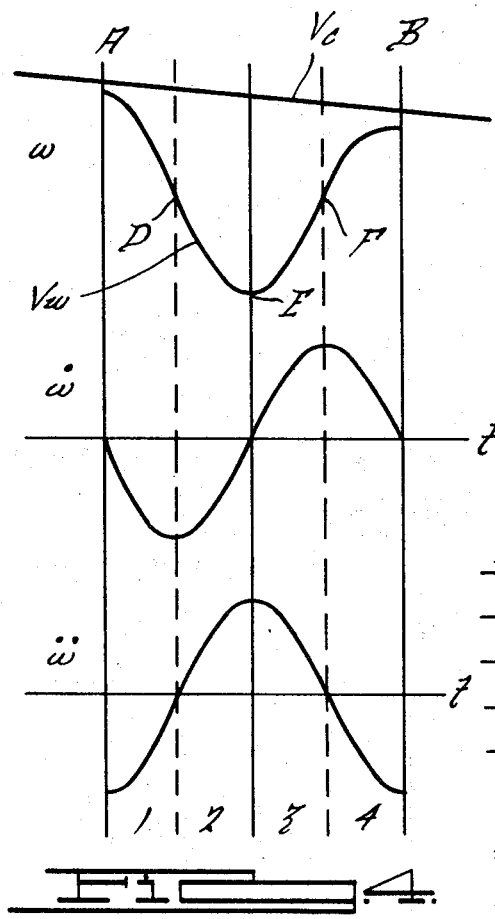
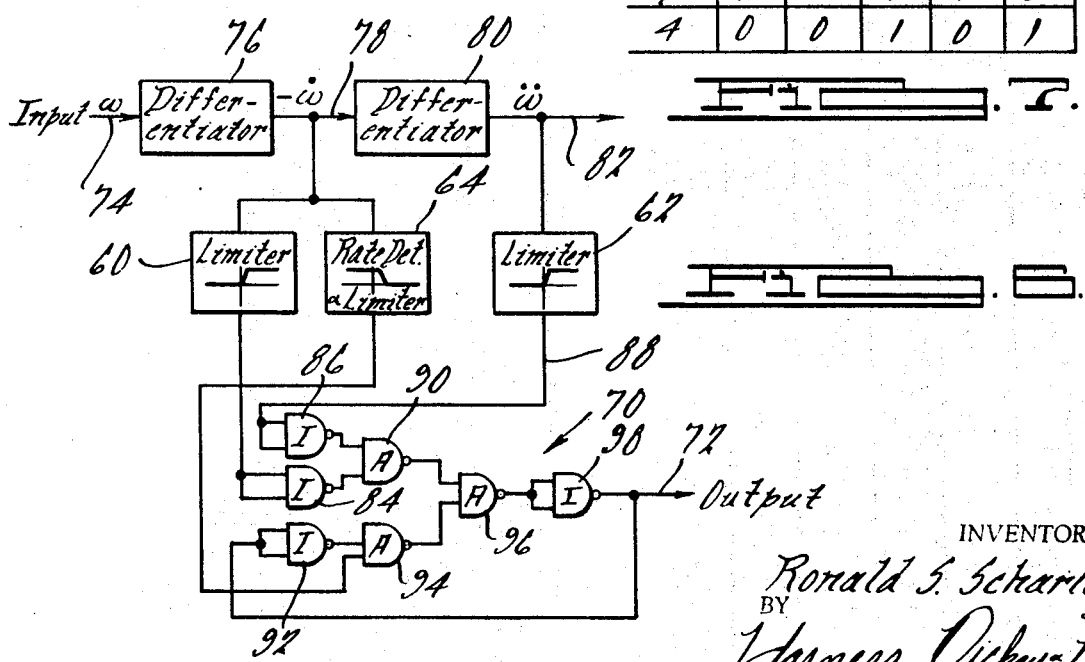

3,532,392
ANTI-SKID BRAKING SYSTEM
Ronald S. Scharlack, San Antonio, Tex., assignor to Kelsey
Hayes, Romulus, Mich., a corporation of Delaware
Filed Oct. 21, 1968, Ser. No. 769,035
Int. Cl. B60t 8/08, 8/12
U.S. Cl. 303—21                                   22 Claims

ABSTRACT OF THE DISCLOSURE

A system for controlling the braking of a wheeled vehicle to prevent skidding in which the braking force applied to the vehicle wheel is effectively responsive to the rate of change of the braking force as a function of wheel slip so that such rate of change is maintained substantially at or near zero during the braking operation under all road conditions. The occurrence of this zero rate of change of the braking force is represented by a control signal generated in response to a preselected polarity of an angular wheel acceleration signal and a change in polarity of the rate of change of the wheel acceleration as the zero rate is achieved from one direction, or a preselected magnitude of angular wheel deceleration as the zero rate is approximately achieved from the other direction.

BACKGROUND AND SUMMARY OF THE INVENTION

This invention relates generally to vehicle braking systems and, more particularly, to braking control means for preventing wheel skidding and for minimizing stopping distances while simultaneously maintaining directional stability.

Further, in describing the system of the present invention, certain terms such as "slip" or "skid" or "slide" are utilized. By way of definition, the term "slip" refers to a characteristic of the rotating element whereby the element rotates at less than its free rolling speed when a braking force or torque is applied. The term "skid," or "slide" refers to a locked wheel condition. The present invention is directed to optimizing the slip condition and preventing skid thereby enhancing stopping ability while substantially eliminating loss of control of the vehicle.

One of the major difficulties which arise in braking a moving vehicle, such as an automobile, an aircraft or other wheeled vehicle, occurs when the braking wheel, or wheels, "lock up"; this "lock up" tends to create an unstable condition in the controlled motion of the vehicle. At the same time a locked wheel condition generally increases stopping distance.

A skid control system has been evolved which provides maximum efficiency under various road conditions while utilizing a relatively simple computational system. This system, disclosed in copending application by Ronald S. Scharlack, Ser. No. 626,626, filed Mar. 28, 1968, takes into account the changing road conditions which result in a change in the coefficient of friction. In the system of the copending application, the linear and angular accelerations of the braking wheel, or wheels, are sensed by appropriate accelerometer devices. The output signals from such accelerometers are fed to a simple analog computer system which produces output signals proportional to the rate of change of the braking force as a function of time and to the rate of change of the wheel slip as a function of time.

By utilizing simple gating logic, circuit elements responsive only to changes in the polarities of such output signals, a control signal can be produced and applied to the braking system of the vehicle for providing optimum operation at the most efficient performance point of the overall braking system. For maximum efficiency the system of the invention is arranged to produce a minimum rate of change of braking force as a function of slip so that ideally such rate of change is maintained substantially at or near zero independent of the road conditions which exit. For further details, reference is made to the disclosure of the copending application which is incorporated herein by reference.

While the above described system is effective to accomplish the above results, it has been found that the basic principles of the copending application may be utilized while further reducing cost, complexity and manufacturing and installation time. The system of the present invention eliminates the requirement of accelerometer devices to sense the linear and angular acceleration of the braking wheel and substitutes in lieu thereof, a single angular velocity sensing device for providing a condition signal which is indicative of the angular wheel velocity. This condition signal provides all of the information necessary to effectively operate the skid control system of the present invention and accomplish essentially maximum efficiency and optimum operation of the braking system.

In considering a wheeled vehicle, the expression describing the torque factors acting on each wheel is as follows:

$$T_B = I\ddot{\omega} + \mu F_n R$$
$$T_B = I\ddot{\omega} + F_t R$$

where $T_B$ = Brake torque
$\mu$ = Coefficient of friction between tire and road
$F_n$ = Normal force of tire on the road
$F_t$ = Tangential force between tire and road
$R$ = Rolling radius of tire
$I$ = Moment of inertia of tire and wheel
$\ddot{\omega}$ = Angular deceleration of tire In order to optimize the brake operation, it is desired to maximize the brake force, which is the optimum slip condition on the brake force versus slip curve described in the copending Scharlack application. This condition occurs when the wheel achieves maximum spin-up or maximum acceleration for the particular conditions encountered. In order to sense this maximum acceleration, the system of the present invention generates a rate of change of acceleration signal, which, when at zero, indicates a maximum acceleration or deceleration.

Under the conditions where the wheel is spinning-up or accelerating, the brake pressure is known to be either zero or a constant depending on the particular system being utilized. Accordingly, the term for the brake torque ($T_B$) may be assumed to be zero or a constant. Thus, the first derivative of the torque expression is $\dot{F}_t R = O + I\dddot{\omega}$, the derivative of the brake torque being zero for either a zero or constant brake pressure. Accordingly, the first derivative of the brake force is proportional to the rate of change of acceleration ($\dot{F} \sim \dddot{\omega}$) after eliminating the effect of the constant wheel mass. Thus, to maximize the braking force (optimum slip on the brake force versus slip curve), the rate of change of acceleration must be at a zero point when the wheel is accelerating, this point being at the point of maximum brake force. However, the fluid inertia of the system precludes the instantaneous application of the brakes. Accordingly, the system finds to overshoot the maximum brake force point.

When the wheel begins to decelerate with the brakes applied, the brake torque is not a constant or zero. Thus, the assumption made in connection with the spin-up portion of the cycle is no longer valid. Accordingly, the deceleration signal generated within the control system is monitored and the brakes are triggered to the on condition when a preselected deceleration is reached which is indicative of an incipient skid condition.

Accordingly, it is one object of the present invention to provide an improved system for operating the brake of a wheeled vehicle.

It is another object of the present invention to provide an improved skid control system for the brake or brakes of a wheeled vehicle.

It is a further object of the present invention to provide a brake control system of the type described which is capable of eliminating skidding or sliding of the braked wheel by sensing the angular velocity of the braked wheel.

It is still a further object of the present invention to provide an improved skid control system for the brake of a vehicle which is simple and inexpensive to manufacture and install, and is reliable in use.

Further objects, features and advantages of this invention will become apparent from a consideration of the following description, the appended claims and the accompanying drawings in which:

FIG. 1 is a schematic diagram illustrating a representative vehicle brake system which may be utilized in conjunction with the control system of the present invention;

FIG. 2 is a schematic diagram illustrating the brake pressure versus time relationship of a brake assembly which is adapted to be utilized in conjunction with the control system of the present invention;

FIG. 3 is a graph illustrating the velocity versus time relationship of the vehicle velocity curve and the wheel angular velocity curve of the skid control system of the present invention;

FIG. 4 is a representative variation of a portion of FIG. 3 and further includes a graph of the first and second derivative of the portion of FIG. 3;

FIG. 5 is a chart of the polarity signs of the various portions of FIG. 4;

FIG. 6 is a schematic diagram illustrating a circuit for accomplishing the features of the prevent invention; and FIG. 7 is a table illustrating the logic outputs of the various logic modules of FIG. 6.

The skid control system of the present invention is particularly adapted to be utilized and will be described specifically for use with an automotive vehicle. However, it should be understood that the features of the invention may be utilized with other types of vehicles including aircraft and other wheeled vehicles which are adapted to provide a braking through a wheel type of element. In the case of an automotive use, the system of the present invention may be utilized in connection with either the front wheels, the rear wheels or both the front and rear wheels. However, for simplicity, the system will be described for use in conjunction only with the rear wheels of an automotive vehicle.

Referring now to FIG. 1, there is illustrated, in schematic form, a skid control system which may be utilized in conjunction with the rear wheels of an automotive vehicle, the rear wheels of the vehicle including brake drums 10 and wheel brake cylinders 12. The brake cylinders 12 are operated by applying pressure through hydraulic lines 14 which are connected to a common fluid line 16, the pressure being supplied by a master cylinder assembly 20 of conventional construction and manually actuated through a foot pedal 22. The fluid pressure from master cylinder 20 is controlled by means of a modulating valve 24 connected between the fluid lines 16 and 18. Thus, the modulating valve 24 controls the fluid pressure to the wheel brake cylinders and ultimately the operation of the brakes. The specific details of the brake assembly and brake drums have been omitted to further simplify the disclosure.

The modulating valve 24 in the present system is actuated in accordance with the electrical signal obtained from electrical control module 26, the control module forming a major part of the present invention. The module 26 receives information from wheel velocity sensors 28 which are associated with each of the brake drums 10 by means of a rotating element 30 for sensing the angular velocity of the wheel. Any suitable wheel velocity sensor may be utilized with the system of the present invention and accordingly, the details of the sensor 28 and rotating element 30 also have been omitted for simplicity.

As will be explained hereinafter, the control module 26 is constructed to sense the velocity and changes in velocity of the wheel as generated by the sensor 28 and provide an output signal in response to the magnitude of the rate of change of velocity of the wheels reaching a preselected value. The output or control signal is transmitted, by means of conductor 32, to the modulating valve 24. In the system of the present invention the control module 26 provides an "on" or "off" signal and control of the fluid pressure to the brake cylinders 12 will be provided by this modulating effect. In some skid control systems the magnitude of the fluid pressure to the brakes is varied in response to an electrical output signal of varying magnitude. It is to be understood that this system is merely shown for illustrative purposes and other hydraulic systems may be utilized with the control system of the present invention.

Referring now to FIG. 2, there is illustrated a graph depicting the brake pressure versus time relationship which can be achieved in a skid control system utilizing the present invention in conjunction with the valve 24. Curve A illustrates the relationship of brake fluid pressure versus time for a conventional brake system in which the pressure is increased from zero to the maximum fluid pressure available in the system. Under certain road conditions, application of maximum brake pressure will result in a skidding. As stated above, if the vehicle wheels are locked, the effectiveness of the brake system in stopping the vehicle is reduced. It has been theorized that effective braking can be realized when the wheel slip is maintained between 10 and 20%. The wheel slip has been defined as the ratio of difference between car velocity ($Vc$) and brake wheel velocity ($Vw$) to car velocity ($Vc$) or $$\frac{Vc - Vw}{Vc}$$

The brake pressure curve for braking the vehicle at the desired slip, in a particular set of road conditions, has been designated curve B and any brake pressure above curve B will tend to result in excessive wheel slip and may ultimately result in skidding. It can be seen that the maximum pressure of curve B is less than the maximum obtainable pressure of the system, thus indicating that the system must be controlled to produce less than maximum braking pressure at the wheel in order to stop the vehicle in the shortest distance.

In the system of the present invention with the valve 24, the modulating valve 24 responds to the output signal from the module 26 to provide for a modulated brake pressure curve C. The curve C approximates the ideal brake pressure curve and hence provides a characteristic for stopping the vehicle in the shortest possible distance. The specific details of the modulating system are described in application of Every et al., Ser. No. 642,861, filed June 1, 1967, for Skid Control System and assigned to the assignee of the instant application. Specific reference to this application is made herein and the details thereof are incorporated by reference; as noted the system of the present invention can be utilized with other types of pressure control apparatus.

Referring now to FIGS. 3 and 4 there is illustrated a graph of idealized conditions between wheel velocity and vehicle velocity for stopping the vehicle in a minimum distance while avoiding skidding of the wheels. The curve of FIG. 3 illustrates the velocity of the vehicle $Vc$ and variation of the velocity of the wheel $Vw$ as produced by modulating the brake pressure of the wheel in accordance with the present invention. It is seen that the brakes are applied at a particular velocity (starting velocity) and the car starts to decelerate along the curve Vc. However, the wheel velocity immediately starts to decrease at a more rapid rate and will ultimately start skidding to decrease the wheel velocity to zero if the condition is permitted to persist.

However, at point D on the curve, corresponding to the preselected rate of deceleration described above and selected for purposes of illustration, the brake pressure is released and the wheel is permitted to spin-up. The start of the spin-up portion is indicated at the point E of the wheel velocity curve and is lower than point D due to the delay in the dropping of the brake pressure to zero or some low fixed value. At a certain rate of change of the spin-up, i.e. acceleration, (point F), the brake pressure is again applied and the wheel is caused to run-down or decelerate. The point F is to be noted to correspond to the point of maximum brake pressure on the brake pressure versus slip curve. In the situation of the instant application, the point D is selected by sensing the deceleration and, when the deceleration reaches a preset value, the brake pressure is applied. On the other hand, the spin-up point or point F is selected by sensing the sign of the wheel acceleration and also sensing the change in sign of the rate of change of wheel acceleration and correlating this information.

Thus, in the present invention the idealized braking curve is closely approximated by generating a signal which is indicative of the magnitude of deceleration of the wheel and releasing brake pressure at such time as the magnitude of deceleration reaches a determined value and on spin-up to correlate the wheel acceleration with the wheel rate of change of acceleration to signal the system to reapply brake pressure. Thus, the brake is successively applied and released to permit the vehicle to decelerate at an optimum rate.

FIG. 4 illustrates the portion of the curve of FIG. 3 between lines A and B and designates the points D and F wherein the brake pressure is released and reapplied, respectively. The middle portion of FIG. 4 is a graph illustrating the first derivative of the angular velocity of the wheel, thus providing a curve of the angular acceleration of the wheel as related to time. The lower portion of FIG. 4 illustrates the curve representing the second derivative of angular velocity of the wheel, i.e. the rate of change of acceleration of the wheel as related to time. The point where this curve crosses zero between periods three and four again corresponds to the maximum brake pressure and optimum slip points. The upper, middle and lower curves have been broken down into four periods designated 1, 2, 3 and 4. Thus, through the process of differentiating the angular velocity of the wheel, the angular acceleration and rate of change in acceleration of the wheel may be derived.

FIG. 5 is a chart illustrating the sign of the three curves in the respective periods designated 1, 2, 3, 4 for each of the angular velocity, angular acceleration and rate of change of angular acceleration.

Referring now to FIG. 6, there is illustrated a schematic block diagram of a preferred system. For purposes of describing FIGS. 6 and 7, it will be assumed that the selected deceleration (point D) occurs totally within period one rather than the point D described in FIG. 4 and occurring at the change from period one to two. The system of FIG. 6 is adapted to utilize the sensed wheel angular velocity and derive the angular acceleration and a rate of change of angular acceleration signal therefrom. These various signals are fed through a first and second limiter circuit 60, 62 and a rate detector and limiter circuit 64. This latter circuit is utilized to generate a signal to release brake pressure when the preselected deceleration is achieved. The outputs of these latter circuits 60, 62 and 64 are fed through a logic system 70 to provide an output signal on output conductor 72. The output signal on output conductor 72 is either a logical one or a logical zero signal and is utilized to control the release and reapplication of brake pressure to the brake system, respectively, resulting in wheel spin-up or run-down, in accordance with the particular condition sensed. For purposes of this specification a logical one signal is used to indicate a positive potential and a logical zero signal is used to indicate a zero potential.

Specifically, the output of the wheel angular velocity sensor is fed through an input conductor 74 which is connected with the input section of a first differentiator circuit 76. The circuit 76 differentiates the input angular velocity signal to provide an angular acceleration signal on conductor 78. This angular acceleration signal on conductor 78 is fed through a second differentiator circuit 80 to provide a rate of change of angular acceleration signal on conductor 82 which is utilized to enable the reapplication of the brake pressure. The output of differentiator 76 is also fed through the limiter circuit 60 and thence to an inverter circuit 84. Similarly, the output of limiter 62 is fed to a second inverter circuit 86 by means of conductor 88. The output signals from inverter circuit 84, 86 are fed to an "and" gate 90.

The output signal on conductor 72 is fed back to the input circuit of an inverter 92, the output of which is fed to an "and" gate 94, the gate 94 further including an input signal from the rate detector circuit 64. The output of gate 94 is fed to an output gate 96, the gate 96 also being responsive to the output signals from gate 90. The output signal from gate 96 is fed through inverter circuit 98 to the output conductor 72. Obviously, the output signal from gate 96 may be fed directly into the input circuit of gate 94 to eliminate the double inversion of this signal by inverters 98 and 92.

Referring now to FIG. 7, there is illustrated the output signal generated by the various logic modules in response to the variation in wheel velocity for the periods 1, 2, 3 and 4 as broken down in FIG. 4 and charted in FIG. 5. As is seen from the upper table, during the first period, the output of limiter 60 is at a logical one level, and the output of limiter 62 is at a logical zero level. The output of rate detector and limiter 64, during the first period, varies between a logical one and a logical zero level due to the fact that the threshold level for the rate detector is selected to be at a level which occurs during the first period. Thus, prior to the occurrence of the preselected deceleration rate or the output of rate detector 64 is at a logical one level. After the preselected deceleration point is achieved, the output of rate detector 64 switches to a logical zero level.

The logical one from limiter 60 is inverted through inverter 84 and produces a logical zero level signal during the first period. The output of inverter 86 is at a logical one level during the first period.

During the second period, the outputs of 60 and 62 are at a logical one level and the output of rate detector 64 switches from a logical zero to a logical one level. This is due to the fact that the magnitude of the deceleration rises to a point above the set rate of the rate detector 64. The outputs of inverters 84 and 86 are at a logical zero level during the second period due to the fact that the outputs of limiters 60 and 62 are at a logical one level. During period three, the output of limiter 60 is at a logical zero and the output of limiter 62 is at a logical one level, and the output of inverters 84 and 86 are at a logical one and logical zero level, respectively. During the third period and during the fourth period, the output of rate detector 64 is at a one level during the entirety of both periods because the wheel is accelerating during this period, thus above the preset deceleration point.

The lower portion of FIG. 7 indicates the outputs of the various "and" gates 90, 94 and 96, the output of output conductor 72 and the inverter 98. The output of gate 90 is at a logical one level any time that either the outputs of limiters 60 and 62 are at a one level or both the outputs of limiters 60 and 62 are at a logical zero level. This occurs during the first, second and third periods. However, during the fourth period, both the outputs of limiters 60 and 62 are at a logical zero level, these signals being inverted by inverters 84, 86, thereby providing a logical zero level at the output of gate 90 during the fourth period.

Assuming that the output of output conductor 72 is at a logical zero level as indicated in the upper portion of the first period, the output of inverter 92 will be a logical one level and the output of gate 94 will be at a logical zero level due to the fact that a logical one level also exists at the output of rate detector 64. With the output of gate 90 a a logical one level and the output of gate 94 at a logical zero level, the gate 96 will provide a logical one level. With the output of gate 96 at a logical one level, the inverter 98 will invert this signal to provide a logical zero level output at conductor 72, thus confirming the original assumption that the output conductor 72 is at a logical zero level. Also it is to be noted that these conditions occur when the rate detector 64 has not reached the preselected deceleration rate either from the application of the brakes by the operator or from the previous cycle.

Assuming that the output of conductor 72 is at a logical one level for the second half of period one (the deceleration magnitude being reached), the output at inverter circuit 92 will be at a logical zero level. As stated above, during the first period the output of gate 64 switches from a logical one to a logical zero level thereby changing the output of gate 94 from a logical zero to a logical one. This switches the output of gate 96 from a logical one to a logical zero, this logical zero being inverted by inverter 98 to provide the originally assumed logical one level signal. This corresponds to the release of the brake pressure due to the reaching of the preselected deceleration magnitude on run-down.

During the second period, gate 90 is at a logical one level and it is assumed that the output conductor 72 is at a logical one level. With 72 at a logical one level, inverter 92 will then be at a logical zero level and the output of 94 will be at a logical one level when rate detector 64 is at a logical one level and will remain at a logical one level even though rate detector 64 switches to a logical zero level. This is due to the fact that the output of gate 92 remains at a logical zero level. With gates 90 and 94 remaining at a logical one level, the output of gate 96 will remain at a logical zero level, this latter signal being inverted by gate 98 to provide a logical one level at the output conductor 72. The same situation occurs for period three wherein rate detector 64 remains at a logical one level. The outputs of 90 and 94 remain at a logical one level to provide a logical zero level output signal at gate 96. This output signal is inverted by gate 98 to provide a logical one level at the output of gate 72.

However, in the fourth period, the outputs of both limiters 60 and 62 are switched to a logical zero level to provide a logical one input signals to gate 90. This switches the output of gate 90 to a logical zero level which is fed to the input of gate 96 assuming that the output of conductor 72 switches to a logical zero level. The gate 94 will switch to a logical one level to provide a logical one level signal at the output conductors 96. This is inverted by the inverter circuit 98 to a logical zero level which confirms the assumption that conductor 72 is impressed with a logical zero level output signal. This point corresponds to the point of maximum acceleration and the point of reapplication of the brakes.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a brake system for a vehicle including braking means for applying a braking force to at least one wheel of the vehicle and control circuit means for controlling said braking means by cyclically applying and releasing the braking force, the improvement comprising sensing means for sensing the angular velocity of the wheel, first means for deriving an acceleration signal in response to the sensed velocity, second means for deriving a rate of change of acceleration signal in response to the sensed velocity, and output control means correlating said acceleration and rate of change of acceleration signals and generating an output signal for controlling the control circuit during at least a portion of the braking cycle in response to said correlated signals.

2. The improvement of claim 1 wherein said portion of the braking cycle is the portion at which the braking force is applied.

3. The improvement of claim 1 wherein said first means generates a signal wave having at least one portion of a preselected first characteristic and said second means generates a signal wave having a second wave characteristic, said output signal being generated in response to the coincidence of said preselected first and said second characteristic.

4. The improvement of claim 3 wherein said first characteristic is the polarity of the signal wave.

5. The improvement of claim 3 wherein the second characteristic is a change in polarity of said signal wave.

6. The improvement of claim 5 wherein said first characteristic is the polarity of the signal wave.

7. The improvement of claim 6 wherein said output control means includes output gate means connected to said first and second means, said output gate means generating said output signal in response to said first characteristic indicating an acceleration condition of the wheel and said second characteristic indicating a change in polarity of said rate of change of acceleration wave.

8. The improvement of claim 3 wherein said first means includes a first differentiator circuit connected to the velocity sensor for deriving an acceleration wave form in response to changes in the velocity and said second means includes a second differentiator circuit connected to said first differentiator circuit for deriving a rate of change of acceleration wave form in response to changes in said acceleration wave form, and first gate means connected to respond to said first and second differentiator circuits and produce a first signal in response to a preselected polarity of the acceleration signal and a change in polarity of the rate of change of acceleration wave form.

9. The improvement of claim 8 wherein said output control means further includes rate detector circuit means connected to said first differentiator circuit for generating an acceleration magnitude signal in response to the acceleration being at or on one side of an acceleration magnitude.

10. The improvement of claim 9 further including output gate means connected to respond to the output signal from said first gate means and said rate detector circuit means during at least a portion of the braking cycle.

11. The improvement of claim 10 further including second gate means having an input from said rate detector circuit and a feedback input from said output gate, said output gate responding to said rate detector circuit during a first portion of said brake cycle and to said second gate during a second portion of said cycle.

12. The improvement of claim 11 wherein said first portion is during the deceleration portion of the cycle and said second gate and said output gate responds to a preselected magnitude of deceleration during said first portion, and said second portion is during the acceleration portion of the cycle and said output gate responds to said first signal generated by said first gate means.

13. In a brake system for a vehicle including braking means for applying a braking force to at least one wheel of the vehicle and control circuit means for controlling said braking means by cyclically applying and releasing the braking force, a method of maximizing the braking force comprising the steps of sensing the angular velocity of the wheel, deriving an acceleration signal in response to the sensed velocity, deriving a rate of change of acceleration signal in response to the sensed velocity, and correlating said acceleration and rate of change of acceleration signals and generating an output signal for controlling the control circuit during at least a portion of the braking cycle in response to said correlated signals.

14. The method of claim 13 wherein said portion of the braking cycle is the portion at which the braking force is applied.

15. The method of claim 13 wherein said acceleration signal is a signal wave having at least one portion of a preselected first characteristic and said rate of change signal is a signal wave having a second wave characteristic, said output signal being generated in response to the coincidence of said preselected first and said second characteristic.

16. The method of claim 15 wherein said first characteristic is the polarity of the signal wave.

17. The method of claim 15 wherein the second characteristic is a change in polarity of said signal wave.

18. The method of claim 17 wherein said first characteristic is the polarity of the signal wave.

19. The method of claim 18 further including generating said output signal in response to said first characteristic indicating an acceleration condition of the wheel and said second characteristic indicating a change in polarity of said rate of change of acceleration wave.

20. The method of claim 15 further including generating an acceleration magnitude signal in response to the acceleration being at or on one side of an acceleration magnitude.

21. The method of claim 20 further including the step of generating a feedback signal from said output signal, said output signal responding to said acceleration signal magnitude and said feedback signal during a first portion of said brake cycle and to said coincidence signal during a second portion of said cycle.

22. The method of claim 21 wherein said first portion is during the deceleration portion of the cycle and said output signal is generated in response to a preselected magnitude of deceleration during said first portion, and said second portion is during the acceleration portion of the cycle and said output signal is generated in response to said first signal generated.

References Cited
UNITED STATES PATENTS 3,398,995   8/1968   Martin _____ 303—21
3,469,662   9/1969   Dewar _____ 303—21

MILTON BUCHLER, Primary Examiner

J. J. McLAUGHLIN, JR., Assistant Examiner

U.S. Cl. X.R.

188—181